US009846888B2

(12) United States Patent
Perreault et al.

(10) Patent No.: US 9,846,888 B2
(45) Date of Patent: Dec. 19, 2017

(54) METHOD AND APPARATUS FOR REWARD CALCULATION AND DISBURSEMENT

(71) Applicant: MasterCard International Incorporated, Purchase, NY (US)

(72) Inventors: Bruno D. Perreault, Darien, CT (US); Christopher P. Aguas, Weston, CT (US); Jay A. Coisman, Danbury, CT (US); Brigette A. White, Cortland Manor, NY (US); Theresa Ann Erickson, St. Charles, MO (US); James E. Pastrana, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 587 days.

(21) Appl. No.: 14/467,846

(22) Filed: Aug. 25, 2014

(65) Prior Publication Data

US 2014/0365289 A1 Dec. 11, 2014

Related U.S. Application Data (63) Continuation of application No. 11/960,281, filed on Dec. 19, 2007, now abandoned.
(Continued)

(51) Int. Cl.
*G06Q 30/00* (2012.01)
*G06Q 30/02* (2012.01)
(Continued)

(52) U.S. Cl.
CPC ......... *G06Q 30/0226* (2013.01); *G06Q 20/02* (2013.01); *G06Q 20/023* (2013.01);
(Continued)

(58) Field of Classification Search
CPC ................................................. G06C 30/0207
(Continued)

(56) References Cited

U.S. PATENT DOCUMENTS 6,345,261 B1 * 2/2002 Feidelson ............ G06Q 20/387
705/14.18
6,450,407 B1 * 9/2002 Freeman ............ G06K 19/0723
235/376

(Continued)

OTHER PUBLICATIONS

"Canadian Intellectual Property Office: Canadian Office Action", dated Jan. 6, 2017 (Jan. 6, 2017), for Canadian Application No. 2,681,463, 5pgs.

*Primary Examiner* — Matthew L Hamilton
(74) *Attorney, Agent, or Firm* — Buckley, Maschoff & Talwalkar LLC (57) ABSTRACT

Methods and systems for receiving purchase transaction data and identifying the purchase transactions that qualify for customer rebates. In an embodiment, a transaction clearing computer of a payment processing network receives the purchase transaction data from a plurality of acquirer financial institutions. A rewards system computer of the payment processing network identifies individual purchase transactions that qualify for customer rebates pursuant to rewards programs and based on the purchase transaction data, and then initiates crediting of rebate amounts from acquirer financial institutions to payment card accounts of cardholders at issuer financial institutions. The rewards system computer also initiates charging of the rebate amounts to merchant accounts of merchants associated with the individual purchase transactions that qualified for customer rebates.

11 Claims, 5 Drawing Sheets

Related U.S. Application Data (60) Provisional application No. 60/911,341, filed on Apr. 12, 2007.

(51) Int. Cl.
 *G06Q 20/02* (2012.01)
 *G06Q 20/12* (2012.01)

(52) U.S. Cl.
 CPC ............. *G06Q 20/12* (2013.01); *G06Q 30/02* (2013.01); *G06Q 30/0234* (2013.01)

(58) Field of Classification Search
 USPC ............................................................ 705/14
 See application file for complete search history.

(56) References Cited

U.S. PATENT DOCUMENTS

| | | | | |
|---|---|---|---|---|
| 6,865,544 | B1* | 3/2005 | Austin | G06Q 20/20 705/1.1 |
| 7,120,591 | B1* | 10/2006 | Solomon | G06Q 30/00 705/14.34 |
| 8,126,772 | B1* | 2/2012 | LeFebvre | G06Q 30/02 705/14.34 |
| 8,639,571 | B1* | 1/2014 | Leason | G06Q 20/387 705/14.1 |
| 2002/0107791 | A1* | 8/2002 | Nobrega | G06Q 20/02 705/39 |
| 2002/0152116 | A1* | 10/2002 | Yan | G06Q 20/10 705/14.14 |
| 2002/0178354 | A1* | 11/2002 | Ogg | G06Q 20/382 713/155 |
| 2003/0229540 | A1* | 12/2003 | Algiene | G06Q 30/02 705/14.21 |
| 2004/0215514 | A1* | 10/2004 | Quinlan | G06Q 30/02 705/14.23 |
| 2005/0080672 | A1* | 4/2005 | Courtion | G06Q 30/02 705/14.32 |
| 2005/0149387 | A1* | 7/2005 | O'Shea | G06Q 20/387 705/14.17 |
| 2005/0240477 | A1 | 10/2005 | Friday et al. | |
| 2006/0136299 | A1* | 6/2006 | Ruhmkorf | G06Q 20/24 705/14.17 |
| 2006/0235747 | A1 | 10/2006 | Hammond et al. | |
| 2007/0000997 | A1* | 1/2007 | Lambert | G06Q 20/20 235/380 |
| 2007/0143177 | A1* | 6/2007 | Graves | G06Q 20/10 705/14.15 |
| 2007/0288372 | A1* | 12/2007 | Behar | G06Q 30/02 705/14.27 |
| 2008/0021772 | A1* | 1/2008 | Aloni | G06Q 20/10 705/14.27 |
| 2009/0248506 | A1* | 10/2009 | Goldstein | G06Q 30/0226 705/14.27 |

* cited by examiner

1
METHOD AND APPARATUS FOR REWARD CALCULATION AND DISBURSEMENT

CROSS-REFERENCE TO RELATED APPLICATIONS

This is a U.S. Continuation Patent Application of U.S. patent application Ser. No. 11/960,281 filed on Dec. 19, 2007, which claims the benefit of U.S. Provisional Patent Application No. 60/911,341, filed on Apr. 12, 2007, which applications are hereby incorporated by reference.

BACKGROUND

Embodiments disclosed herein relate to payment systems. In particular, some embodiments relate to methods, apparatus, systems, means and computer program products for processing rewards in a payment processing network.

Payment card loyalty programs have been in widespread use for some time. Most consumers who hold payment cards participate in some form of loyalty program, including merchant-specific frequent buyer programs, airline mileage programs, or the like. In general, these programs are successful, as many consumers who participate in loyalty programs indicate that their participation in the programs has an impact on their purchasing decisions.

Unfortunately, the ubiquity of these programs has led to dilution of their impact. With so many programs, and so little differentiation, customers' behaviors are not directly driven by the programs. As a result, many customers do not actively participate in many loyalty programs even after they have enrolled.

The reward delivery mechanism for most loyalty programs has primarily been the use of store coupons, statement inserts or other printed coupons that require a customer to redeem the coupon in a future purchase. Currently, it is estimated that the percentage of reward coupons that are redeemed by customers is less than 1% of the total coupons distributed.

Further, many merchants simply do not have the expertise or ability to effectively use their customer data to develop and administer reward programs. It would be desirable to reduce the barriers to consumers to make it easier for them to participate and receive rewards. It would further be desirable to provide systems and methods that allow merchants to easily deploy and administer rewards programs.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, one or more rewards programs funded by a merchant or merchants are implemented via a payment processing network such as the Global Clearing Management System (GCMS) administered by MasterCard International, Inc., the assignee hereof A rewards system computer is associated with the payment processing network. The rewards system computer stores information that defines the rewards programs. The rewards program information indicates what purchase transactions qualify for rewards, and the amounts of the rewards. The rewards system computer screens purchase transaction data generated by the payment processing network with respect to purchase transactions cleared through the payment processing network. The rewards system computer identifies purchase transactions that qualify for rewards such as rebates. To implement the rebates, the rewards system computer initiates payment transactions. The payment transactions are cleared through the payment processing network to cause rewards rebates to be credited to cardholder accounts. The rewards system computer also generates data files that are transmitted to acquirers to indicate on a transaction-by-transaction basis amounts that the acquirers should charge back to merchants who fund the rewards programs.

These systems and methods allow for rewards rebates funded by merchants to be automatically and conveniently credited to payment card accounts of customers who participate in rewards programs, while automatically charging the rebates to the merchants via the acquirer banks. Processing and administrative economies are realized by using a previously existing payment processing network as the vehicle for payment and funding of rewards rebates. Little or no modification of the payment processing network itself is required, since a separate rewards system computer is associated with the payment processing network to generate the rebate transactions to be handled through existing mechanisms of the payment processing network.

Figures 1, 1A:
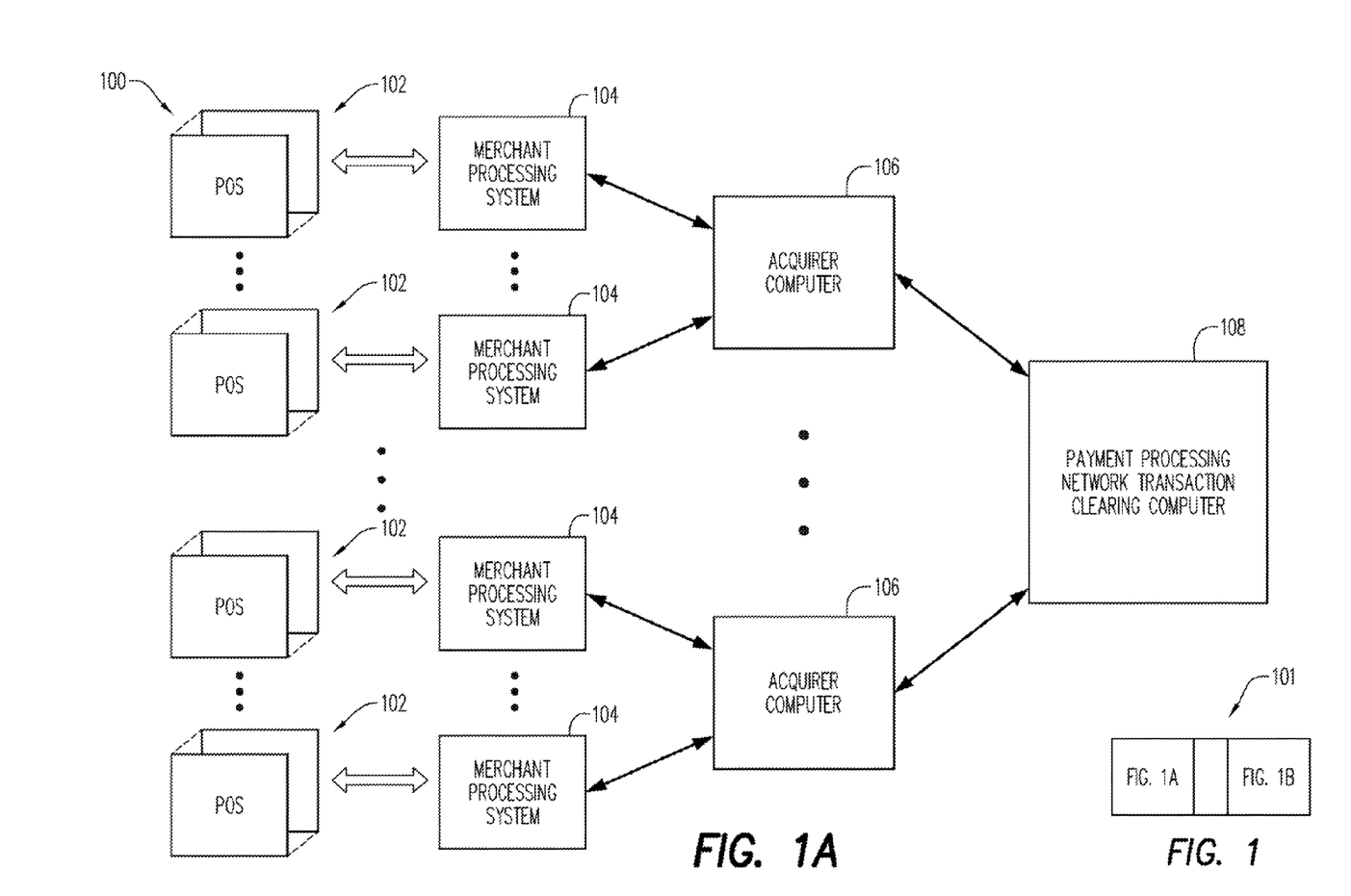
FIGS. 1A and 1B together form a block diagram of a payment processing network provided according to certain embodiments.
Figure 1B:
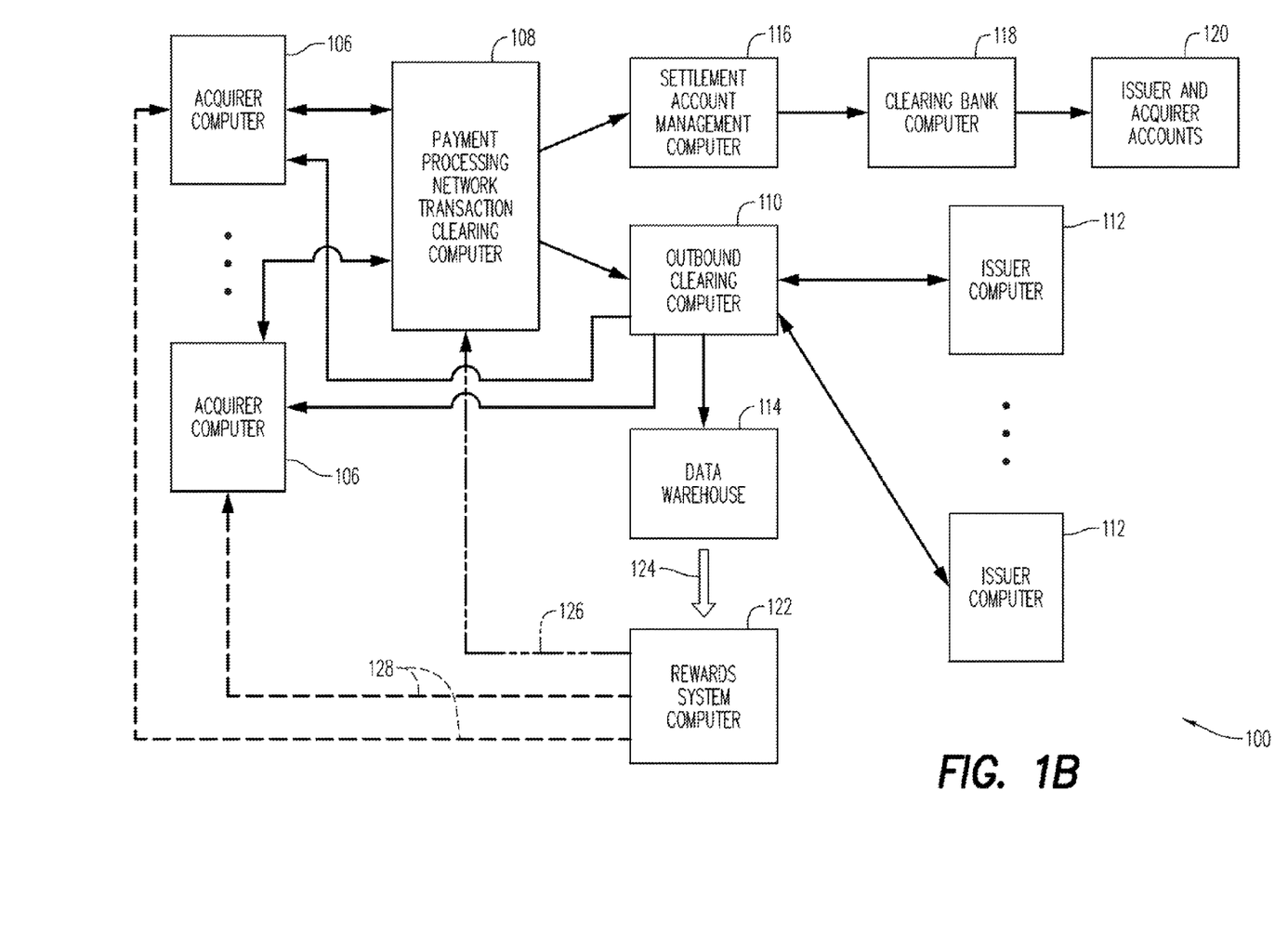

FIGS. 1A and 1B together form a block diagram representation of a payment processing network 100 provided according to certain embodiments. The right side of FIG. 1A overlaps with the left side of FIG. 1B (as indicated at 101) such that certain components of the payment processing network 100 are shown on both of FIGS. 1A and 1B.

The payment processing network 100 includes numerous POS locations 102 (FIG. 1A). The term "POS location" refers to "points of transaction" such as internet commerce sites that receive payment account numbers from customers who shop online, mail order or telephone (MOTO) merchants who receive payment account numbers by telephone and/or mail, and physical point of sale terminals located in brick-and-mortar retail stores. In the case of physical point of sale terminals, a payment card (not shown; may be, e.g., a credit or debit card, a charge card or stored value card, or a corporate or so-called fleet card) is presented to the terminal by a customer and read by the terminal to input the number of the payment card account to which a purchase transaction is to be charged. In the case of other types of POS location, the payment card account number is input into the POS location by human data entry or the like.

The POS locations 102 are presented in FIG. 1A in groups that include one or more POS locations, where each group of POS locations is connected to a respective merchant processing system 104. Each merchant processing system 104 is a computer or computer system that receives transaction data from the POS locations connected to it and that forwards authorization requests and requests to settle purchase transactions to an acquirer computer 106. In the case of an internet shopping site, the POS location(s) and the merchant processing system may be integrated together into a single computer system. In some cases (not illustrated), the POS location 102 may communicate directly with an acquirer computer 106, without an intervening merchant processing system. The term "acquirer" is widely used in the payment processing field, and refers to financial institutions such as banks or other financial systems that have agreement with merchants to receive and forward purchase transaction authorizations and settlement requests on behalf of the merchants. The term "acquirer" also refers to processing agents that act on behalf of such financial institutions or systems. Each acquirer typically serves numerous merchants, and accordingly each acquirer computer 106 is shown as being in communication with numerous merchant processing systems 104. Moreover, a typical payment processing network serves numerous acquirers, and FIGS. 1A-1B therefore schematically show numerous acquirer computers 106.

In addition to the acquirer computers 106, the payment processing network 100 includes a payment processing network transaction clearing computer 108. The transaction clearing computer 108 is in communication, at least from time to time, with the acquirer computers 106, and may be operated by or on behalf of a payment card association such as MasterCard International, Inc. The transaction clearing computer 108 receives purchase transaction clearing requests, typically in batches, from the acquirer computers 106. (In a typical manner of operating a payment processing network, the payment card association also operates a separate computer, which is not shown, to receive transaction authorization requests from acquirers and to pass the authorization requests to issuers of payment cards. However, in an alternative embodiment, the payment card association computer which handles authorization requests may be integrated with the transaction clearing computer 108.)

Referring now to FIG. 1B, the payment processing network 100 also includes an outbound clearing computer 110. The outbound clearing computer 110 is in communication with the transaction clearing computer 108. The outbound clearing computer 110 receives from the transaction clearing computer 108 data required to clear purchase transaction requests that the transaction clearing computer has received from acquirer computers, and for which the transaction clearing computer has determined clearing destinations (i.e., issuers).

FIG. 1B also shows, as part of the payment processing network 100, issuer computers 112. Issuer computers 112 are operated by financial institutions that have issued the payment cards used by customers in connection with the payment processing network 100. In the case of MasterCard International, Inc., numerous issuers participate in the MasterCard payment processing network, and accordingly numerous issuer computers 112 are schematically shown as receiving clearing messages from the outbound clearing computer 110. As is well-known, the issuers maintain payment card accounts of the cardholders. The clearing messages from the outbound clearing computer 110 indicate (typically in batches) transactions that are to be charged by the issuers to the cardholders' accounts.

The outbound clearing computer 110 is also in communication with the acquirer computers 106 to provide, to the acquirer computers, acknowledgements that the purchase transactions requested by the acquirer computers have been cleared.

The payment processing network 100 also includes a data warehouse 114. The data warehouse 114 receives from the outbound clearing computer 110, and stores, data that represents the purchase transactions cleared by the outbound clearing computer 110. The purchase transaction data is stored in the data warehouse 114 to allow for post-auditing of the clearing operation.

Also included in the payment processing network 100 is a settlement account management computer 116. The settlement account management computer 116 is in communication with the transaction clearing computer 108 and receives settlement account data from the transaction clearing computer 108. The settlement account data received by the settlement account management computer 116 represents settlements to be made among issuers and acquirers with respect to the purchase transactions cleared by the transaction clearing computer 108.

The payment processing network 100 further includes a clearing bank computer 118. The clearing bank computer 118 is operated by a bank that represents the payment card association and handles the actual exchange of funds among issuers and acquirers as needed to settle the purchase transactions cleared by the transaction clearing computer 116. The clearing bank computer 118 is in communication with the settlement account management computer 116 and receives from the settlement account management computer 116 a feed of data that directs the clearing bank computer to implement the exchange of funds required by the clearing operation. Accordingly, as indicated at 120, the clearing bank computer performs funds transfers between issuer and acquirer accounts.

All of the aspects of the payment processing network 100 that have been described up to this point with reference to FIGS. 1A and 1B may be conventional and may operate in a substantially conventional manner. However, in accordance with principles of the present invention, the payment processing network 100 may also include or have associated therewith a rewards system computer 122 (FIG. 1B). The rewards system computer 122 may be connected (at least from time to time) with the data warehouse 114 in such a manner as to allow the rewards system computer 122 to fetch (as indicated at 124) purchase transaction data stored in the data warehouse 114. The rewards system computer 122 may also be in communication, at least from time to time, with the transaction clearing computer 108 and with the acquirer computers 106 to allow the rewards system computer to provide data feeds 126, 128 to the transaction clearing computer 108 and to the acquirer computers 106, respectively. Details of operation of the rewards system computer 122 will be described below. Suffice it to say for the moment that the rewards system computer 122 may implement and manage rewards programs, including programs that provide rebates to cardholders, and that the rewards system computer 122 may initiate transactions to be cleared through the payment processing network to effect payment of the rebates.

Further, in accordance with aspects of the invention, and as discussed further below, the transaction clearing computer 108 may provide information to the acquirer computers 106 relative to rebates paid to cardholders via the transaction clearing computer 108.

The blocks representing system components shown in FIG. 1B may be considered to be laid out in five columns, with the second column consisting of only one block—that which represents the payment processing network transaction clearing computer 108. The blocks represented in the second and third columns (encompassing blocks 108, 116, 110, 114 and 122) may in some embodiments be operated by a payment card association such as MasterCard International, Inc.; the other blocks shown in FIGS. 1A-1B may be operated by other entities.

Figure 2:
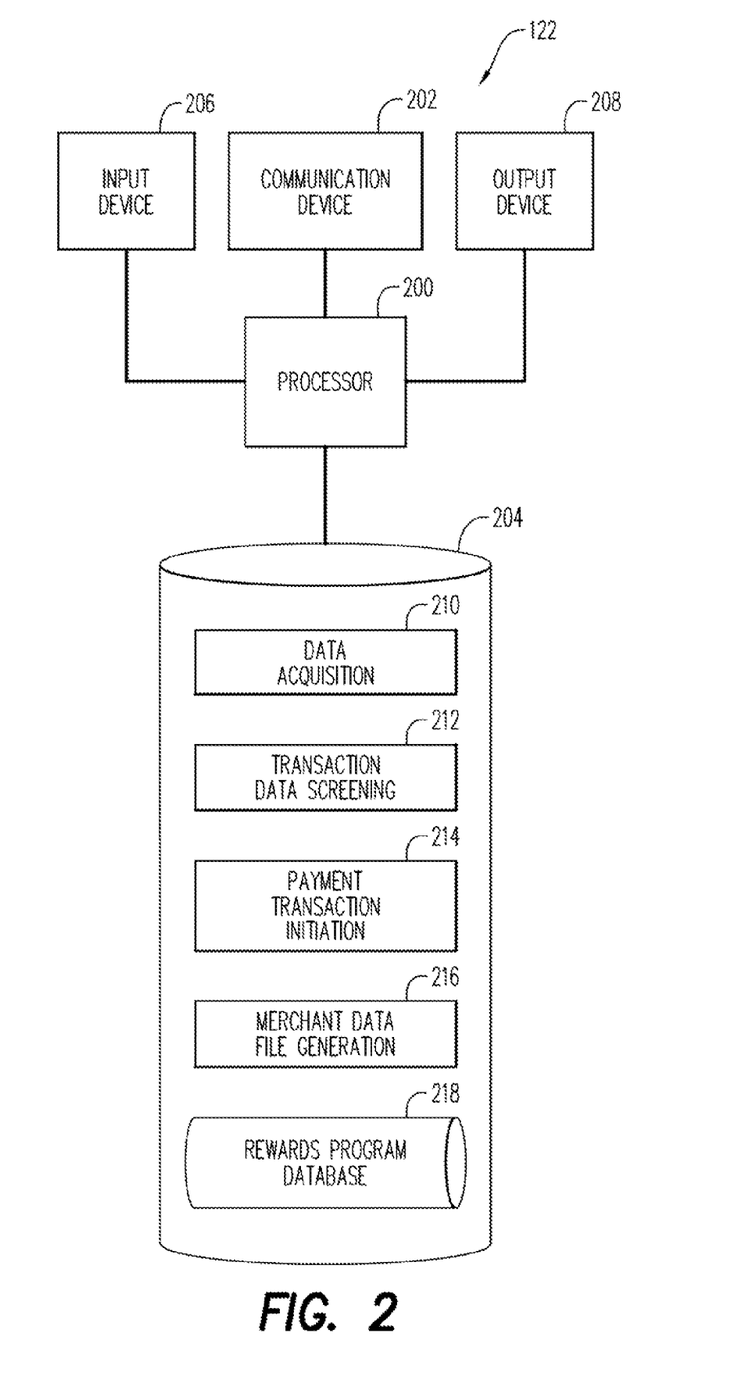
FIG. 2 is a simplified block diagram of a rewards system computer that is part of the system of FIGS. 1A-1B.

FIG. 2 is a simplified block diagram of the rewards system computer 122 that is shown in FIG. 1B. The rewards system computer 122 may be conventional in its hardware aspects but may be controlled by software to cause it to operate in accordance with aspects of the present invention.

The rewards system computer 122 may include a computer processor 200 operatively coupled to a communication device 202, a storage device 204, an input device 206 and an output device 208.

The computer processor 200 may be constituted by one or more conventional processors. Processor 200 operates to execute processor-executable steps, contained in program instructions described below, so as to control the rewards system computer 122 to provide desired functionality.

Communication device 202 may be used to facilitate communication with, for example, other devices (such as the data warehouse 114, the payment processing network transaction clearing computer 108 and the acquirer computers 106 shown in FIG. 1B).

Input device 206 may comprise one or more of any type of peripheral device typically used to input data into a computer. For example, the input device 206 may include a keyboard and a mouse. Output device 208 may comprise, for example, a display and/or a printer.

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 204 stores one or more programs for controlling processor 200. The programs comprise program instructions that contain processor-executable process steps of rewards system computer 122, including, in some cases, process steps that constitute processes provided in accordance with principles of the present invention, as described in more detail below.

The programs may include an application 210 that allows the rewards system computer 122 to retrieve transaction data from the data warehouse 114. The transaction data retrieved from the data warehouse 114 may include data that represents transactions cleared through the payment processing network 100 via the transaction clearing computer 108 and the outbound clearing computer 110. In addition the programs may include an application 212 that controls the rewards system computer 122 to screen the transaction data for the purpose of identifying purchase transactions that qualify the cardholder for rebates pursuant to rewards programs administered by the payment processing network 100. More particularly, the rewards programs may be administered by a payment card association that operates the payment processing network 100.

Application 214 is another application that may be included in the programs stored in the storage device 204. Application 214 may include software program instructions to control the rewards system computer 122 to initiate payment transactions in the payment processing network 100 to cause rebates to be credited to the payment card accounts of cardholders determined by the rewards system computer as qualifying for rewards program rebates.

Further, the programs stored in the storage device 204 may include an application 216. Application 216 may control the rewards system computer 122 to generate data files to be transmitted to acquirer computers 106 concerning the payment transactions referred to in the preceding paragraph.

Storage device 204 may also store a database 218 that contains data concerning rules for rewards programs administered in the payment processing network 100. This data may be referenced and used by the application 212 in the course of controlling the rewards system computer 122 to identify cardholders who have qualified for rebates. There may also be stored in storage device 204 other unshown elements that may be necessary for operation of the rewards system computer 122, such as an operating system, a database management system, other applications, other data files, etc.

The other computers referred to above in connection with FIGS. 1A-1B may be conventional in terms of their hardware aspects and thus may be similar in hardware architecture to the rewards system computer 122. Also, in at least some aspects of their operations, the components other than the rewards system computer 122 may operate in a conventional manner for providing a payment processing network, while also implementing functions required to respond to the below-described operations of the rewards system computer 122.

Figure 3:
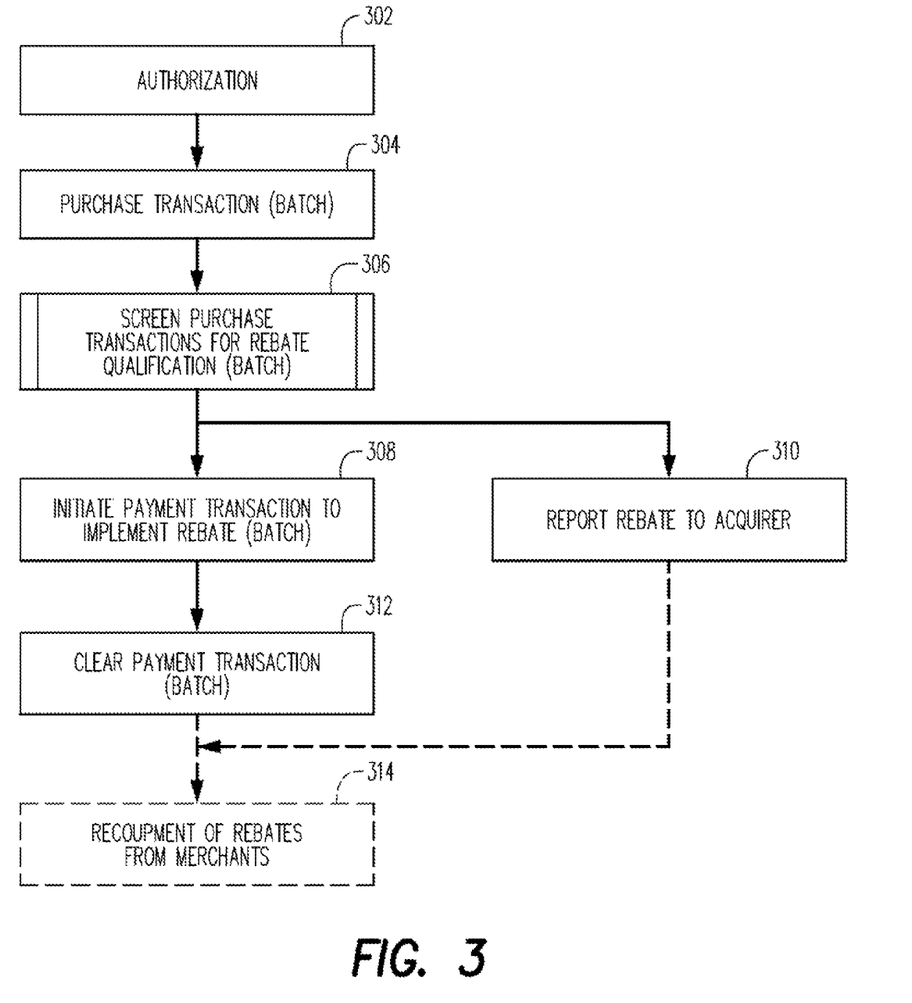
FIG. 3 is a flow chart that illustrates a process performed in accordance with aspects of the present invention in the system of FIGS. 1A-1B.

FIG. 3 is a flow chart that illustrates a process performed in accordance with aspects of the present invention in the system of FIGS. 1A-1B. In part, the process illustrated in FIG. 3 may be considered to represent the "life cycle" of a purchase transaction in a payment processing network that, in accordance with aspects of the invention, administers rewards rebate programs funded by participating merchants.

At 302 in FIG. 3, an authorization request for a purchase transaction is processed through the payment processing network 100. In some embodiments, the authorization request may be performed entirely in a conventional manner, and thus is well-understood by those who are skilled in the art. Nevertheless, for completeness of background, the authorization request procedure will now be briefly described. The authorization request procedure will be described in the context of a purchase transaction in a retail store, but may alternatively, with minor alterations, be performed in connection with a purchase conducted online, by telephone or by mail.

The authorization request may be initiated by a customer/cardholder bringing to a POS terminal 102 one or more items that the customer desires to purchase from a retailer. The POS terminal generates, in a conventional manner, a total dollar amount due for the purchase transaction. In addition, the customer's payment card account number is input to the POS terminal by, e.g., the POS terminal reading a magnetic stripe on the customer's payment card or by employing proximity reading in the case of a contactless payment card or device. The merchant processing system 104 generates the authorization request, which includes the customer's payment account number, the transaction total dollar amount and other customary information. The authorization request is routed through the acquirer computer 106, and the payment card association data processing facilities, to the authorization server of the issuer of the customer's payment card/device. (In practical embodiments of the invention, at least some of the components used in processing the authorization request may be independent of the transaction clearing network illustrated in FIGS. 1A-1B.

Accordingly, the data processing facilities that handle the authorization request and the response thereto may not be shown in FIGS. 1A-1B.) The authorization server may determine whether the payment card account number is valid, whether the account remains active, whether there is adequate credit or enough funds in the account to support the transaction, etc. Based on these determinations, the authorization server may send a response back through the authorization request channels to the POS terminal 102. The response may either authorize the transaction or decline the transaction. If the transaction is authorized, a "hold" may be placed on the payment card account in the amount of the transaction total, and the transaction may be allowed to proceed at the POS terminal.

Assuming that the transaction is authorized, then at 304 in FIG. 3 the merchant submits the transaction for clearing and it is cleared through the payment processing system. The transaction clearing process, like the authorization process, may be performed in a conventional manner and in accordance with practices that are understood by those who are skilled in the art. However, as in the case of the authorization process, the transaction clearing process will now be described to provide a complete background to the novel practices that constitute aspects of the present invention.

Typically, the merchant submits the purchase transaction for clearing in a batch process with other transactions at the close of business or overnight. The batch of data is transmitted from the merchant processing system 104 to the acquirer computer 106 operated by or on behalf of the acquiring financial institution that services the merchant. For each purchase transaction, some or all of the following data may be submitted: (a) payment account number (i.e., the payment card number), (b) the brand applied to the card by the issuing financial institution, (c) the dollar amount of the transaction, (d) the type of the payment card (consumer versus fleet/corporate), (e) the date of the transaction, (f) a "processing code" that indicates the type of transaction (in this case assumed to be a purchase transaction), (g) a code to indicate whether the transaction was at a retail POS terminal, versus an online, mail order or telephone transaction, (h) a code to indicate whether the card presented was a magnetic stripe card or a smart card, (i) a code that identifies the POS terminal from among the merchant's other POS terminals, (j) the name of the merchant, and (k) the currency (e.g., dollars) in which the transaction was conducted. Other data may also be included in the data submitted for the transaction.

The acquirer computer 106 receives all of this data and then passes it on to the payment processing network transaction clearing computer 108. In addition to the data received from the merchant processing system 104, the acquirer computer 106 also sends to the payment processing network transaction clearing computer 108 the following additional data: (l) a code that identifies the acquirer, (m) (for each transaction) a code that identifies the issuer of the payment card tendered for the transaction, and (n) a code that identifies the merchant.

The payment processing network transaction clearing computer 108 receives a batch of transaction data from the acquirer computer 106 and performs various validation processes on the data for each transaction to confirm that the data is complete and valid. Then the payment processing network transaction clearing computer 108 combines each transaction in a batch with other transactions bound for the same issuer, and transmits the resulting batch of transactions to the outbound clearing computer 110. The outbound clearing computer 110 sends the batch of transactions to the issuer computer 112 operated by or on behalf of the issuer. The issuer then charges each transaction to the corresponding payment card account for the cardholder who initiated the transaction.

In addition, the outbound clearing computer 110 sends an acknowledgement to the acquirer computer for each transaction to indicate that the transaction has been cleared. The outbound clearing computer 110 also stores all of the transaction data in the data warehouse 114 to allow for subsequent audit of the transactions cleared through the system.

The payment processing network transaction clearing computer 108 also provides data to the settlement account management computer 116, so that the settlement account management computer is able to perform calculations to aggregate and net out amounts to be settled from each issuer to each acquirer. Based on the resulting settlement position amounts, the settlement account management computer 116 provides settlement instructions to the clearing bank computer 118. Based on the settlement instructions, the clearing bank computer 118 causes funds to be transferred between accounts (indicated at 120) that belong to the issuers and the acquirers.

In accordance with conventional practices, a charge referred to as an "interchange" may be deducted from the amount settled to the acquirer in connection with each transaction. Some or all of the interchange may accrue to the issuer and/or to the payment card association. It is also customary for the acquirer to deduct the interchange or a fee that includes the interchange from the amount that the acquirer credits to the merchant with respect to the transaction.

Figure 4:
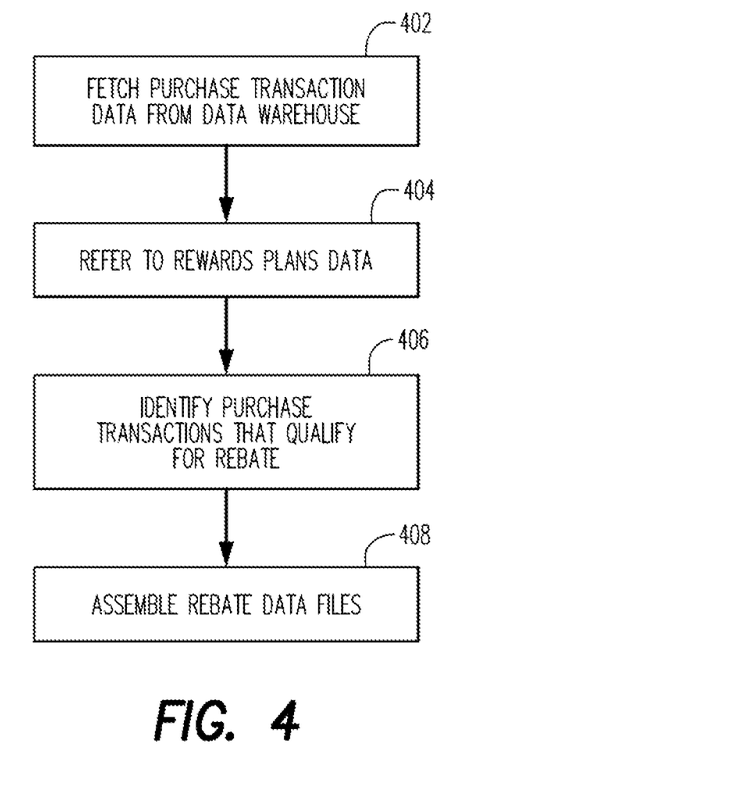
FIG. 4 is a flow chart that illustrates a certain details of the process illustrated in FIG. 3.

Referring once more to FIG. 3, at 306, and in accordance with aspects of the present invention, the rewards system computer 122 (FIG. 1B) screens the purchase transactions cleared through the system to identify purchase transactions that qualify for rebates. FIG. 4 is a flow chart that illustrates details of step 306.

At 402 in FIG. 4, the rewards system computer 122 fetches a batch of transaction data from the data warehouse 114. Presumably, the batch of transaction data includes only purchase transactions that the rewards system computer has not previously screened.

At 404 in FIG. 4, the rewards system computer 122 refers to data (stored in database 218, FIG. 2) that defines various rewards programs administered by the rewards system computer 122.

At 406 in FIG. 4, the rewards system computer 122 uses the rewards program data to consider each purchase transaction to determine whether the purchase transaction qualifies for a rebate. For example, one rewards program may provide that each payment card account in a range of payment card account numbers is to receive a rebate (such as a fixed percentage of the transaction amount) for the first transaction at a certain merchant that occurs within a certain time period. As another example, a rewards program may provide that, for each payment card account in a range of payment card accounts, every transaction at a given merchant during a certain period of time earns a rebate equal to a fixed percentage of the transaction. As still another example, if the purchases of a payment card account at a certain shopping mall during a certain period aggregate to more than a given amount, a fixed dollar rebate may be earned. Many other types of rewards rebate programs are possible, and the rewards system computer 122 may administer many rewards programs at a given time, including many different rewards rebate programs. If the rewards program calls for a rebate to be made, the data which defines the rewards program may also indicate how the rebate is to be calculated, and the rewards system computer 122 may calculate the amount of the rebate accordingly.

To implement the rebates for purchase transactions identified as qualifying by the rewards system computer 122, the rewards system computer 122 may (as indicated at 408 in FIG. 4) generate two different types of data files.

The first type of data file generated at 408 is to be transmitted to the payment processing network transaction clearing computer 108 to initiate payment transactions. As is familiar to those who are skilled in the art, a "payment transaction" is a transaction that—in contradistinction to a purchase transaction—results in a flow of funds from an acquirer to an issuer and from the issuer as a credit to the cardholder's account. The payment transaction data file may include, for each rebate to be made, the following data: (a) the payment card account number of the account to which the rebate is to be credited, (b) the merchant that is funding the rebate in accordance with the relevant rewards program, (c) the amount of the rebate, (d) a code that identifies the acquirer of the purchase transaction that qualified for the rebate, (e) a code that identifies the issuer of the payment card in question, and (f) a code that identifies the rewards program under which the rebate is being paid. Referring again to FIG. 3, block 308 indicates that this data file is provided from the rewards system computer 122 to the payment processing network transaction clearing computer 108 to initiate the payment transactions. This may occur on the processing day after the day on which the underlying purchase transactions were cleared.

The second type of data file generated at 408 (FIG. 4) is to be transmitted to each acquirer. The data in this type of file reflects the original purchase transactions (i.e., one or more underlying transactions) that qualified for rebates. Each data file of the second type is for a particular acquirer and represents information from the original purchase transactions. The data for each rebate identifies underlying purchase transactions that qualified for the rebate. The data regarding the underlying purchase transactions may include: (a) date(s) of the underlying purchase transaction(s), (b) amount(s) of the underlying purchase transaction(s), and (c) the acquirer's identification number(s) for the underlying purchase transaction(s). The data referred to in this paragraph may be sent to the acquirer in either or both of two formats: (1) As a report, or (2) as a data file. Block 310 of FIG. 3 represents the rewards system computer 122 sending this data in either or both forms to the acquirers. This too may occur on the processing day after the day on which the underlying purchase transactions are cleared.

According to another aspect of step 310, the transaction clearing computer 108 transmits to the acquirer computers 106 data files that reflect the payment transactions cleared via the transaction clearing computer 108 for the purpose of providing rebates to customers, as directed by the rewards system computer 122.

Block 312 in FIG. 3 represents clearing of the payment transactions initiated at 308. The payment processing network transaction clearing computer 108 receives the data feed provided at 308 from the rewards system computer 122 as a batch of payment transactions to be cleared. As noted above, in the payment transactions, contrary to conventional purchase transactions, the flow of funds is to be "backwards", i.e., from the acquirers to the issuers. In this respect, the rebate/payment transactions are similar to conventional transactions such as charge-backs initiated by issuers when cardholders dispute charges to their accounts, or credit transactions in which the cardholder returns previously purchased goods to a merchant, who then through the acquirer initiates a transaction to reverse a prior purchase transaction.

Upon receiving the data feed from the rewards system computer 122, the payment processing network transaction clearing computer 108 may perform validation processing to confirm the validity and formal integrity of the requested payment transactions. Further, based on the rewards program identifying codes, and based on a source of data that provides definitions of the various rewards programs, the payment processing network transaction clearing computer 108 determines that the merchant (rather than the acquirer or issuer) is the source of funding for the rebates implemented with the payment transactions. The payment processing network transaction clearing computer 108 then combines each payment transaction in a batch with other transactions bound for the same issuer, and transmits the resulting batch of transactions to the outbound clearing computer 110. The outbound clearing computer 110 sends the batch of transactions, including the payment transactions, to the issuer computer 112 for the issuer in question. The issuer than posts each payment transaction as a credit to the corresponding payment card account for the cardholder who is to receive the rebate. Further, the outbound clearing computer 110 sends a report and a data file to the acquirer computer to indicate the rebate that is being paid and the merchant to which the rebate is to be charged. In addition, the outbound clearing computer 110 sends an acknowledgement to the acquirer computer for the acquirer in question to indicate that the payment transaction has been cleared. The outbound clearing computer 110 also stores all of the transaction data, including the data for the payment transactions, in the data warehouse 114 to allow for auditing of the payment transactions and the other transactions cleared on that day.

It is not necessary for the outbound clearing computer 110 to send an acknowledgement of the payment transaction to the rewards system computer 122. This is because the rewards system computer 122 is able to audit data in the data warehouse 114 to verify that the payment transaction was sent by the outbound clearing computer 110 to the issuer computer 112.

The payment processing network transaction clearing computer 108 also provides data to the settlement account management computer 116, so that the settlement account management computer is able to perform calculations to aggregate and net out amounts to be settled between issuers and acquirers. For example, the amounts to be settled from acquirers to issuers in respect of the payment transactions may be netted against amounts to be settled from issuers to acquirers in respect of purchase transactions cleared on that day. Based on the resulting settlement position amounts, the settlement account management computer 116 provides settlement instructions to the clearing bank computer 118. Based on the settlement instructions, the clearing bank computer 118 executes transfers of funds among the issuer and acquirer bank accounts 120.

According to aspects of the present invention, the amounts settled from acquirers to issuers in respect of the payment transactions may be net of interchange. The interchange applied to reduce the funds settled from the acquirers to the issuers in respect of the payment transactions may be based on the interchange originally applied to the underlying purchase transactions. For example, if the rebate implemented with a payment transaction is 10% of the underlying purchase amount, the interchange netted out from the amount settled from the acquirer to the issuer may be 10% of the interchange applied to the underlying purchase transaction. The netting of the interchange may be based on data provided from the transaction clearing computer 108 to the acquirer computers 106 as described above in connection with step 310, FIG. 3.

(In the event that the cardholder returns a purchase so as to get credit for a purchase transaction, the rewards system computer 122 detects—by reviewing data in the data warehouse 114—that the purchase transaction has been reversed. The rewards system computer then determines whether a reversal of a rebate is called for as a result of the reversal of the purchase transaction. If so, the rewards system computer 122 sends the necessary instructions to the payment processing network transaction clearing computer 108 to reverse the payment transaction.)

Once the payment card association has cleared the payment transaction, has stored data related to the payment transaction, and has provided data concerning the payment transaction to the acquirer, the payment card association's involvement with the rebate and with the payment transaction may be complete. However, there may be further activity with respect to the payment transaction that occurs outside the purview of the payment card association. This further activity is represented in phantom at 314 in FIG. 3. At block 314, the acquirers recoup the rebates from the merchants who are funding the rebate rewards programs. The acquirers are able to do this based on the data files/reports provided to them by the rewards system computer 122 and the transaction clearing computer 108. For example, the acquirers may net out charges for the rebates from amounts that are due to the merchants from the acquirers in respect of purchase transactions initiated by the merchants. The amounts of the rebates charged to the merchants by the acquirers may be net of interchange, so that the merchants are effectively assessed interchange only on the net amount (after application of the rebate) of the purchase transactions that qualified for rebates.

An advantage of the processes described herein is that they allow merchants to create rebate rewards programs for their customers, while conveniently funding and fulfilling the rebates by using the administrative, accounting and data processing capabilities of a pre-existing payment processing network. The rebates are credited directly to customers' payment card accounts and are charged to the funding merchants via the payment processing network and the acquiring financial institutions.

In some embodiments, the merchant-funded rebate rewards programs may include purchase of specific products or services as a qualifying condition for the rebates, in addition to or instead of other qualifying conditions such as date, amount and/or location of purchases. For this purpose the purchase transaction information provided by the merchant and the acquirer downstream to the payment processing network transaction clearing computer 108 may include information that identifies one or more of the items or services purchased in the purchase transaction. This information may ultimately be stored, after clearing of the purchase transaction, in the data warehouse 114. Thus, the information concerning the item(s) purchased in the purchase transactions may be retrieved by the rewards system computer 122 and compared with the requirements of the rebate rewards programs administered by the rewards system computer 122 to determine whether the purchase transactions qualify for rebates. The item identifying information may, for example, be in the form of a stock keeping unit (SKU) number, or a Universal Product Code (UPC) number. According to other examples, a specific indication of the service purchased may be provided, such as origin-destination city pair and/or fare class in the case of an airline flight, or class of vehicle in the case of a car rental agency. In this way, merchants may tie qualification for rebates to purchase of specific items or categories of items. Consequently, rebate rewards programs, implemented through a payment processing network, may take the place of product-specific coupons. This may have the advantage of eliminating the need for the merchant to issue and the customer to redeem coupons.

For at least some purposes, the payment processing network transaction clearing computer 108 and the outbound clearing computer 110 may be considered to be a single computer, and may be collectively referred to as a "payment processing network transaction clearing computer".

The acquirer computer that receives a report and/or a data file from the rewards system computer need not be the same acquirer computer that originally forwarded the purchase transaction data and/or the authorization request.

According to the above discussion of block 314 in FIG. 3, and in accordance with some embodiments, the acquirers may recoup the customer rebates from merchants who sponsor the rewards programs. Alternatively, however, the payment card association may directly bill to merchants, and/or collect from them, amounts needed to fund (e.g., amounts to be recouped by the payment card association in relation to) the customer rebates. Moreover, in some embodiments, the payment transactions initiated by the rewards system computer 122 for the purpose of crediting rewards to customer payment card accounts may be drawn from a settlement account (not shown) maintained on behalf of the payment card association. With this arrangement, acquirers may not be required to modify their conventional interactions with merchants.

In some embodiments, data that reports on and/or summarizes the rebate payments that have been funded by each merchant may be collected by the payment card association and made available on a website for access by the merchant in question.

Up to now, aspects of the present invention have largely been described in the context of crediting payment card accounts that belong to individual consumers. However, the principles of the present invention are also applicable to rewards and rebates provided by crediting payment transactions to payment card accounts owned by small, medium and large businesses and other entities, and/or issued to employees of businesses and other entities, which are responsible for paying charges to such accounts. Payment card accounts thus may also include so-called "ghost accounts" that are used to accumulate charges and/or credits accruing on purchases by payment card account numbers issued to individual employees. In some embodiments, rebates may be directed to payment card accounts not directly associated with individual consumers and/or payment card accounts issued to individual employees.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for processing rewards in a payment processing network comprising:

retrieving, by a rewards system computer executing an application, a batch of purchase transaction data from a data warehouse which has been cleared by a payment processing network transaction clearing computer, the cleared purchase transaction data associated with a plurality of individual purchase transactions not previously screened by the rewards system computer;

identifying, by the rewards system computer executing another application, individual purchase transactions of the batch of purchase transaction data that qualify for a customer rebate without requiring customer redemption of a coupon, wherein the qualifying purchase transactions are identified by comparing purchase transaction data associated with each of the individual purchase transactions with rewards program data associated with a plurality of dissimilar rewards programs;

generating, by the rewards system computer, a payment transaction data file for initiating payment transactions to payment card accounts of cardholders who qualified for a customer rebate, and a plurality of acquirer data files;

transmitting, by the rewards system computer to a payment processing network transaction clearing computer, the payment transaction data file to credit rebate amounts from acquirer financial institutions to the payment card accounts of cardholders at issuer financial institutions, the rebate amounts associated with the individual purchase transactions that qualified for customer rebates; and transmitting, by the rewards system computer to acquirer computers, the plurality of acquirer data files to charge the rebate amounts to merchant accounts of merchants associated with the individual purchase transactions that qualified for customer rebates.

2. The method of claim 1, wherein the rewards program data comprises information identifying a range of payment card account numbers eligible for a rebate.

3. The method of claim 1, wherein the rewards program data comprises rewards program rules.

4. The method of claim 1, wherein the plurality of acquirer data files comprises rebate amounts and merchant identifiers of merchants to be charged for the individual purchase transactions that qualified for customer rebates.

5. The method of claim 1, further comprising auditing, by the rewards system computer of the payment processing network, data stored in the data warehouse to verify that payment transactions were transmitted to issuer computers.

6. The method of claim 1, further comprising:
reviewing, by the reward system computer of the payment processing network, data in the data warehouse;
detecting, by the reward system computer based on the reviewed data, that a purchase transaction has been reversed;
determining, by the rewards system computer, that a reversal of a rebate is required for the reversed payment transaction; and
transmitting, by the reward system computer, instructions to a transaction clearing computer of the payment processing network to reverse the payment transaction.

7. A non-transitory computer-readable storage device storing executable instructions configured to instruct a processor of a rewards system computer to:
execute an application to retrieve, from a data warehouse, a batch of purchase transaction data which has been cleared by a payment processing network transaction clearing computer, the cleared purchase transaction data associated with a plurality of individual purchase transactions not previously screened;
execute an application to identify individual purchase transactions of the batch of purchase transaction data that qualify for a customer rebate without requiring customer redemption of a coupon, wherein the qualifying purchase transactions are identified by comparing purchase transaction data associated with each of the individual purchase transactions with rewards program data associated with a plurality of dissimilar rewards programs administered by the payment processing network;
generate a payment transaction data file for initiating payment transactions to payment card accounts of cardholders who qualified for a customer rebate and a plurality of acquirer data files;
transmit, to the payment processing network transaction clearing computer, the payment transaction data file to credit rebate amounts from acquirer financial institutions to the payment card accounts of cardholders at issuer financial institutions, the rebate amounts associated with the individual purchase transactions that qualified for customer rebates; and
transmit, to acquirer computers, the plurality of acquirer data files to charge the rebate amounts to merchant accounts of merchants associated with the individual purchase transactions that qualified for customer rebates.

8. The non-transitory computer-readable storage device of claim 7, wherein the instructions for transmitting the plurality of acquirer data files comprises executable instructions configured to cause the processor to transmit data files to acquirer financial institution computers comprising rebate amounts and merchant identifiers of merchants to be charged for the individual purchase transactions that qualified for customer rebates.

9. The non-transitory computer-readable storage device of claim 7, further comprising executable instructions configured to cause the processor to audit data stored in the data warehouse to verify that payment transactions were transmitted to issuer computers.

10. The non-transitory computer-readable storage device of claim 7, further comprising executable instructions configured to cause the processor to:
review data in the data warehouse;
detect, based on the reviewed data, that a purchase transaction has been reversed;
determine that a reversal of a rebate is required for the reversed payment transaction; and
transmit instructions to the payment processing network transaction clearing computer to reverse the payment transaction.

11. A payment processing network system for processing rewards, comprising:
a payment processing network transaction clearing computer;
a data warehouse operably connected to the payment processing network transaction clearing computer; and
a rewards system computer comprising a processor and a storage device, the rewards system computer operably connected to the payment processing network transaction clearing computer and to the data warehouse;
wherein the payment processing network transaction clearing computer processes purchase transaction data received from a plurality of acquirer financial institution computers;
and wherein the storage device of the rewards system computer comprises instructions configured to cause the processor of the rewards system computer to:
execute an application to retrieve, from the data warehouse, a batch of purchase transaction data cleared by the payment processing network transaction clearing computer, the cleared purchase transaction data associated with a plurality of individual purchase transactions not previously screened by the rewards system computer;

execute an application to identify individual purchase transactions of the batch of purchase transaction data that qualify for a customer rebate without requiring customer redemption of a coupon, wherein the qualifying purchase transactions are identified by comparing purchase transaction data associated with each of the individual purchase transactions with rewards program data associated with a plurality of dissimilar rewards programs;

generate a payment transaction data file for initiating payment transactions to payment card accounts of cardholders who qualified for a customer rebate and a plurality of acquirer data files;

transmit, to a payment processing network transaction clearing computer, the payment transaction data file to credit rebate amounts from acquirer financial institutions to the payment card accounts of cardholders at issuer financial institutions, the rebate amounts associated with the individual purchase transactions that qualified for customer rebates; and transmit, to acquirer computers, the plurality of acquirer data files to charge the rebate amounts to merchant accounts of merchants associated with the individual purchase transactions that qualified for customer rebates.

\* \* \* \* \*